(12) United States Patent
Raggam et al.

(10) Patent No.: US 7,783,254 B2
(45) Date of Patent: Aug. 24, 2010

(54) SIGNAL PROCESSING CIRCUIT FOR A CONTACTLESS COMMUNICATING COMMUNICATION PARTNER DEVICE

(75) Inventors: Peter Raggam, St.Stefan Im Rosental (AT); Erich Merlin, Gratkorn (AT)

(73) Assignee: NXP B.V., Eindhoven (NL)

(*) Notice: Subject to any disclaimer, the term of this patent is extended or adjusted under 35 U.S.C. 154(b) by 470 days.

(21) Appl. No.: 11/631,809

(22) PCT Filed: Jun. 30, 2005

(86) PCT No.: PCT/IB2005/052179

§ 371 (c)(1),
(2), (4) Date: Dec. 7, 2007

(87) PCT Pub. No.: WO2006/006103

PCT Pub. Date: Jan. 19, 2006

(65) Prior Publication Data

US 2008/0119139 A1    May 22, 2008

(30) Foreign Application Priority Data

Jul. 6, 2004    (EP)    ................... 04103200

(51) Int. Cl.
*H04B 5/00*    (2006.01)
(52) U.S. Cl. .................. 455/41.1; 455/47; 340/10.1
(58) Field of Classification Search ................ 455/41.1; 340/10.1
See application file for complete search history.

(56) References Cited

U.S. PATENT DOCUMENTS

| 5,390,348 | A  | * | 2/1995 | Magin et al. ............... 455/63.1 |
| 6,427,065 | B1 | * | 7/2002 | Suga et al. .................. 455/41.1 |
| 7,164,344 | B2 | * | 1/2007 | Deguchi et al. .......... 340/10.51 |
| 2006/0087319 | A1 | * | 4/2006 | Kregar et al. ............... 324/310 |

* cited by examiner

*Primary Examiner*—Edward Urban
*Assistant Examiner*—Golam Sorowar

(57) ABSTRACT

In a signal processing circuit (3) for a contactlessly communicating communication partner device (1), there are provided a transmitted-signal path (9) and a received-signal path (10), the received-signal path (10) branching off from a branch point (AP) present on the transmitted-signal path (9), a filter stage (11) and a matching stage (12) connected downstream of the filter stage (11) being provided on the transmitted-signal path (9), the filter stage (11) having a resonant frequency that is in a frequency range the center frequency value of which matches an upper sideband frequency, and the branch point (AP) being situated between the filter stage (11) and the matching stage (12).

12 Claims, 3 Drawing Sheets

SIGNAL PROCESSING CIRCUIT FOR A CONTACTLESS COMMUNICATING COMMUNICATION PARTNER DEVICE

FIELD OF THE INVENTION

The invention relates to a signal processing circuit for a contactlessly communicating communication partner device, with which communication partner device both a transmitting mode of operation and a receiving mode of operation are possible, a carrier signal of a given operating frequency being subjected to modulation at at least one given modulation frequency in the receiving mode, thus producing a frequency spectrum at and around the operating frequency having an upper sideband frequency and a lower sideband frequency, which signal processing circuit has at least one transmitted-signal input, at least one received-signal output and at least one transmission-coil connection, and which signal processing circuit has a transmitted-signal path between the at least one transmitted-signal input and the at least one transmission-coil connection and a received-signal path between the at least one transmission-coil connection and the received-signal output, which received-signal path branches off to the received-signal output from a branch point situated on the transmitted-signal path, and which signal processing circuit has, on the transmitted-signal path, a filter stage that is connected to the transmitted-signal input and has a resonant frequency of a given value, and a matching stage connected downstream of the filter stage.

The invention further relates to a communication partner device having a transceiver circuit, a transmission-coil, and a signal processing circuit provided between the transceiver circuit and the transmission-coil, with which communication partner device both a transmitting mode of operation and a receiving mode of operation are possible.

BACKGROUND OF THE INVENTION

A communication partner device of the kind specified in the second paragraph above having a signal processing circuit of the kind specified in the first paragraph above has been put on the market in a number of variant designs by the applicant and the device and circuit in question are therefore known. In the known communication partner device, the transceiver circuit is formed by an integrated circuit or IC, which IC has been put on the market by the applicant under the type number MF RC500. The IC used as a transceiver circuit has two transmitted-signal outputs and one received-signal input. Connected to each of the two transmitted-signal outputs is a transmitted-signal input of the signal processing circuit. Connected to the received-signal input of the IC is a received-signal output of the signal processing circuit. The signal processing circuit includes, on its transmitted-signal path, a filter stage that forms what is termed an EMC filter and is intended to ensure the electromagnetic compatibility laid down by the authorities. Connected to the filter stage is a matching stage that comprises a combination of two series capacitors and two parallel capacitors and by means of which the impedance of a transmission coil connected to the signal processing path can be set to a given desired value. Connected to the matching stage is a damping stage that is formed by means of two resistors, the above-mentioned transmission coil being connected to the damping stage. The quality factor of the transmission coil can be set to a required desired value by means of the damping stage.

In the known design, the filter stage is sized in such a way that the value of the resonant frequency of said filter stage when tolerances are ignored, i.e. the nominal value of the resonant frequency, corresponds to the operating frequency, which operating frequency is for example 13.56 MHz. Also, in the known design, the branch point is provided between the matching stage and the damping stage, meaning that the received signal emitted by the transmission coil is picked off immediately downstream of a resistor in the damping stage.

A result of the design described for the known signal processing circuit is that the filter stage contains an inductor of relatively high inductance, as a result of which a relatively large inductor has to be provided to enable a sufficiently high inductance of approximately 1 μH to be obtained. To obtain a capacitance suited to the inductance of 1 μH, and hence to obtain the desired resonant frequency value, two capacitors connected in parallel have to be provided, which constitutes a relatively high cost. Also, there is the problem with the known design that when steep signal edges occur, which happens when signals in pulse form are being transmitted, a critical overshoot phenomenon occurs, which is a disadvantage. Another thing that has to be said about the known design is that the frequency characteristic that exists in the receiving mode is relatively narrow-band, which proves to be particularly disadvantageous in many applications.

OBJECT AND SUMMARY OF THE INVENTION

It is an object of the invention to overcome the difficulties and problems that occur with the known design using simple means and in a manner that is structurally simple and to provide an improved signal processing circuit and an improved communication partner device.

To enable the object described above to be achieved, features according to the invention are provided in a signal processing circuit according to the invention, thus enabling a signal processing circuit according to the invention to be characterized in the manner specified below, namely:

A signal processing circuit for a contactlessly communicating communication partner device, with which communication partner device both a transmitting mode of operation and a receiving mode of operation are possible, a carrier signal of a given operating frequency being subjected to modulation at at least one given modulation frequency in the receiving mode, thus producing a frequency spectrum at and around the operating frequency having an upper sideband frequency and a lower sideband frequency, which signal processing circuit has at least one transmitted-signal input, at least one received-signal output and at least one transmission-coil connection, and which signal processing circuit has a transmitted-signal path between the at least one transmitted-signal input and the at least one transmission-coil connection and a received-signal path between the at least one transmission-coil connection and the received-signal output, which received-signal path branches off to the received-signal output from a branch point situated on the transmitted-signal path, and which signal processing circuit has, on the transmitted-signal path, a filter stage that is connected to the transmitted-signal input and that has a resonant frequency of a given value of frequency, and a matching stage connected downstream of the filter stage, wherein the value of the resonant frequency of the filter stage is in a range of frequency values the center frequency value of which is defined by the sum of the value of the operating frequency and the value of a modulation frequency, and of which an upper limiting value is defined by the center frequency value plus substantially half the value of the highest modulation frequency and a lower limiting value is defined by the center frequency value minus substantially half the value of the highest modulation frequency, and wherein the branch point present on the transmitted-signal path is situated in a region of the transmitted-signal path that is isolated from the input side of the filter stage by at least one component of the filter stage and from the output side of the matching stage by at least one component of the matching stage.

To enable the object described above to be achieved, features according to the invention are provided in a communication partner device according to the invention, thus enabling a communication partner device according to the invention to be characterized in the manner specified below, namely:

A communication partner device having a transceiver circuit, a transmission coil, and a signal processing circuit provided between the transceiver circuit and the transmission coil, with which communication partner device both a transmitting mode of operation and a receiving mode of operation are possible, wherein the communication partner device includes a signal processing circuit according to the invention as characterized above.

By the provision of the features according to the invention, what is achieved, in a manner that is particularly simple structurally and at no additional cost, is that the difficulties and problems arising in the solution described at an earlier point in the text are overcome. What is also achieved in an advantageous manner is that broadband transmission characteristics are ensured when a receiving mode of operation is taking place, which is advantageous with a view to enabling the transmission of data to take place at a high data transmission rate. When a transmitting mode of operation is taking place, what is also ensured in an advantageous manner is that the magnetic field able to be generated by the transmission coil builds up particularly quickly and the overshoot characteristics are, at the same time, good, which means that there are thus no undesirably high overshoot amplitudes, something that is likewise advantageous with a view to transmission of data that is as swift and satisfactory as possible. With regard to the lower limit that is still permissible for the range of frequency values within the scope of the invention, in which range of frequency values the value of the resonant frequency of the filter stage lies, it should also be mentioned that the lower limiting value is displaced relative to the value of the upper sideband frequency in the direction of the value of the operating frequency but is at a distance, in terms of frequency, from the operating frequency that is so large that the advantages according to the invention, although they may not come into play to an optimum degree, do still come into play to a degree that is appreciably improved over solutions known hitherto.

In a signal processing circuit according to the invention, it has proved advantageous if the signal processing circuit is designed for an operating frequency of 13.56 MHz and for at least one modulation frequency for a group of modulation frequencies, which group comprises 106 kHz, 212 kHz, 424 kHz and 848 kHz, and if the value of the resonant frequency of the filter stage is in a range of frequency values the two limiting values of which are defined by the center frequency value plus 500 kHz and the center frequency value minus 500 kHz. A design of this kind has proved to be advantageous with a view to use in an RFID communication system to standard ISO 18092.

In a signal processing circuit according to the invention as described in the previous paragraph, it has proved particularly advantageous if the value of the resonant frequency of the filter stage is in a frequency range the two limiting values of which are defined by the center frequency value plus 100 kHz and the center frequency value minus 100 kHz. With a design of this kind, particularly wide-band frequency characteristics are ensured in the case of reception. The design in question is also advantageous in having particularly good overshoot characteristics.

It should be mentioned that the provisions according to the invention may also be introduced in other contactless RFID communication systems, and that, when they are, the advantages described above are obtained. RFID communication systems of this kind operate at, for example, operating frequencies of 125 kHz or 6.78 MHz.

It should also be mentioned that it is particularly advantageous if the value of the resonant frequency of the filter stage is virtually the same as the value of the upper sideband frequency. With a solution of this kind, the advantages according to the invention that are described above are obtained to a particularly marked degree. However, to achieve these particularly marked advantages, a relatively high cost has to be paid in terms of the components used for the filter stage, because there are no standard commercial filter components available to produce a value of this kind for the resonant frequency of the filter stage and instead components specially suited to the purpose have to be manufactured.

These and other aspects of the invention are apparent from and will be elucidated with reference to the embodiments described hereinafter, to which however the invention is not limited.

DESCRIPTION OF EMBODIMENTS

Figure 1:
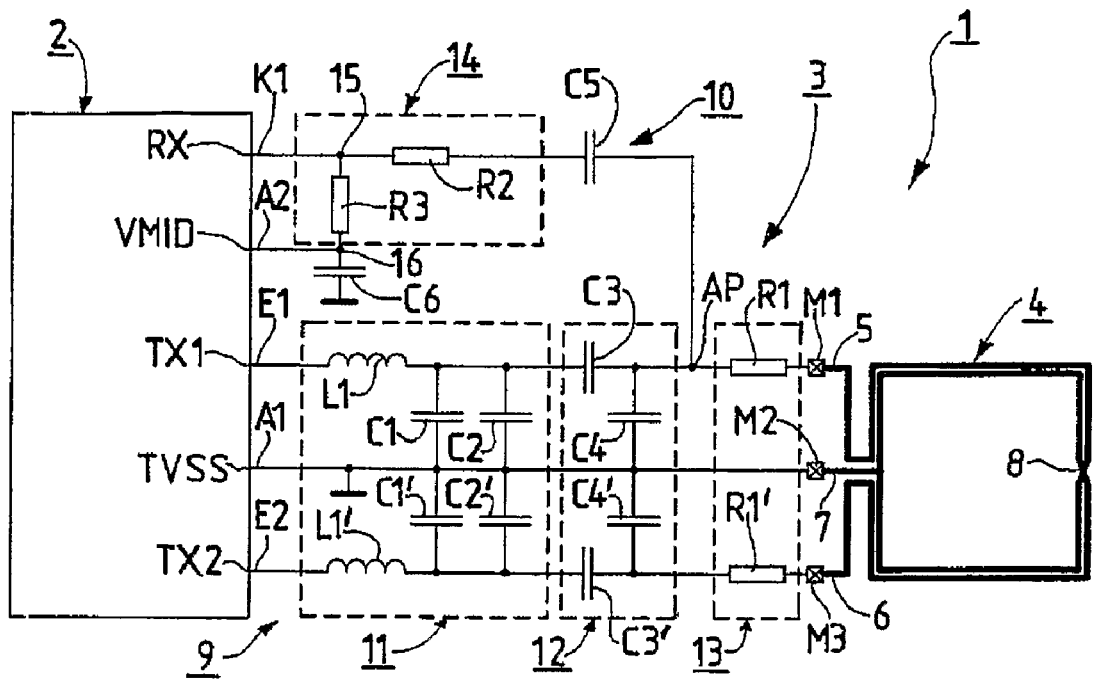
FIG. 1 shows, partly schematically, in the form of a circuit diagram, a communication partner device conforming to the known prior art that includes a signal processing circuit conforming to the known prior art.

FIG. 1 shows a known communication partner device 1 that conforms to the known prior art. The communication partner device 1 is intended and arranged for contactless communication with other communication partner devices. In this case, another communication partner device may be of at least substantially the same design as the communication partner device 1 shown in FIG. 1, but another communication partner device may also be of an appreciably different design. Both a transmitting mode of operation and a receiving mode of operation are possible with the communication partner device 1. In the transmitting mode, the communication partner device 1 transmits data to at least one another communication partner device. In the receiving mode, the communication partner device receives data that has been emitted by at least one other communication partner device.

In a way that has long been known in expert circles and is also laid down in various standards, such as, for example, in standard ISO 14443 or ISO 15693 or ISO 18092, when the communication partner device is in the receiving mode a carrier signal of a given operating frequency is subjected, by means of the other communication partner device, to amplitude modulation at at least one given modulation frequency. The modulation is preferably amplitude modulation (load modulation), where various degrees of modulation are used. In the present case, what is termed 100% ASK is used. It is however also known for what is termed 10% ASK to be used. It should also be mentioned that not only amplitude modulation but also frequency modulation or phase modulation may be used. As a result of the carrier signal of the given operating frequency being modulated at the given modulation frequency, a frequency spectrum arises at and around the operating frequency that has an upper sideband frequency and a lower sideband frequency. Other sidebands occur as well of course, but that is immaterial in the present case.

The communication partner device 1 contains a transceiver circuit 2 that is indicated schematically by a block in the present case. The transceiver circuit 2 is in fact an integrated circuit (IC), which in the present case includes a microprocessor, a cryptographic circuit, a status/control circuit, a data processing circuit and an analog-signal processing circuit. What is provided as a transceiver circuit 2 in the present case is the IC that is marketed by the applicant under the type number MF RC 500. What may also be used in the communication partner device 1 however are other commercially available ICs and also ones that are not yet commercially available but which the applicant has under development.

The transceiver circuit 2 has two transmitted-signal outputs TX1 and TX2 and a first IC port TVSS associated with the two transmitted-signal outputs TX1 and TX2. The transceiver circuit 2 also has a received-signal input RX with which a second IC port VMID is associated.

A signal processing circuit 3 is connected downstream of the transceiver circuit 2. The signal processing circuit 3 is intended and arranged to process analog signals. The design of the signal processing circuit 3 will be more exactly described below. Connected to the signal processing circuit 3 is a transmission coil 4.

The transmission coil 4 has a first coil connection 5, a second coil connection 6 and a third coil connection 7. The third coil connection 7 is what is referred to as a ground terminal. In the present case the transmission coil 4 is two-sided and also symmetrical with respect to the third coil connection 7, for which purpose the transmission coil 4 is provided with a crossover 8. By means of the transmission coil 4, a magnetic field can be generated in the transmitting mode. If a transmission coil of another communication partner device is in, or is brought into, inductive, i.e. transformer-type, coupling with the transmission coil 4 of the communication partner device 1, this results in a signal being generated in the other transmission coil. It becomes possible in this way for data to be transmitted from the communication partner device 1 to the other communication partner device. In a similar way, it also becomes possible for data to be transmitted in the other direction, i.e. when the communication partner device 1 is in the receiving mode.

In the present case the signal processing circuit 3 has two transmitted-signal inputs E1 and E2 and a first circuit connection A1 associated with the two transmitted-signal inputs E1 and E2. The two transmitted-signal inputs E1 and E2 are connected to the two transmitted-signal outputs TX1 and TX2 of the transceiver circuit 2. The first circuit connection A1 is connected to the first IC port TVSS of the transceiver circuit 2. The signal processing circuit 3 also has a received-signal output K1 and a second circuit connection A2 associated with the received-signal output K1. The received-signal output K1 is connected to the received-signal input RX of the transceiver circuit 2. The second circuit connection A2 is connected to the second IC port VMID of the transceiver circuit 2. The signal processing circuit 3 also has a first transmission-coil connection M1, a second transmission-coil connection M2 and a third transmission-coil connection M3. The three transmission-coil connections M1, M2, and M3 are connected to the three coil connections 5, 6 and 7.

Between the two transmitted-signal inputs E1 and E2, the first circuit connection A1 and the three transmission-coil connections M1, M2 and M3, the signal processing circuit 3 has a transmitted-signal path 9. Also, between the first transmission-coil connection M1 and the received-signal output K1 and the second circuit connection A2, the signal processing circuit 3 has a received-signal path 10. In the present case, the received-signal path 10 branches off to the received-signal output K1 from a branch point AP situated on the transmitted-signal path 9.

On the transmitted-signal path 9, the signal processing circuit 3 includes a filter stage 11 that is connected to the transmitted-signal inputs E1 and E2 and to the first circuit connection A1 and that has a resonant frequency of a given value, and a matching stage 12 connected downstream of the filter stage 11. The branch point AP is provided downstream of the matching stage 12 in the present case. Provided downstream of that point on the transmitted-signal path 9 is a damping stage 13 connected downstream of the matching stage 12, which damping stage 13 is provided immediately upstream of the three transmission-coil connections M1, M2 and M3.

The filter stage 11 contains two series inductors L1 and L1' and two configurations of parallel capacitors which each comprise two capacitors C1, C2 and C1', C2' connected in parallel. In respect of their values, the components of the filter stage 11 are so selected that the filter stage 11 has a resonant frequency that corresponds to the operating frequency. In the present case the value of the operating frequency is selected to be 13.56 MHz. The value of the above-mentioned modulation frequency is, in the present case, one of the following group of values, namely 106 kHz, 212 kHz, 424 kHz and 848 kHz. These values of frequency conform to standard ISO 18092. The filter stage 11 is intended as what is termed an EMC stage, the abbreviation EMC standing for "electromagnetic compatibility".

The matching stage 12 has two series capacitors C3, C3' and two parallel capacitors C4, C4'. What is achieved by means of the matching stage 12 is that the impedance of the transmission coil 4 is transformed to a given desired value that is required at the input side of the matching stage 12, thus ensuring a match of the transmission coil 4 to the signal processing circuit 3 that is as nearly optimum as possible and consequently a transmission of energy that is as nearly optimum as possible.

The damping stage 13 contains two series resistors R1, R1'. The quality factor of the transmission coil 4 is reduced to an appropriate desired value by means of the two series resistors R1, R1'. In the present case as a desired value the value 30 is selected.

In the received-signal path 10 there is provided a series capacitor C5 that is connected downstream of the branch point AP and that is intended to block any d.c. voltage that may possibly occur at the branch point AP. Connected downstream of the series capacitor C2 is a voltage divider 14. The voltage divider 14 comprises a first resistor R2 and a second resistor R3, which are connected together at a connecting point 15. The connecting point 15 is connected to the received-signal output K1. By means of the voltage divider 14, a desired level of the modulated carrier signal can be obtained at the received-signal output K1, and consequently at the received-signal input RX of the transceiver circuit 2. At a further connecting point 16, a parallel capacitor C6 is connected to the second resistor R3 of the voltage divider 14. The connecting point 16 is connected to the second circuit connection A2. The parallel capacitor C6 is intended to arrest the high-frequency RF signal received, in order to keep said high-frequency RF signal away from the second IC port VMID of the transceiver circuit 2.

To obtain the above-mentioned resonant frequency for the filter stage 11, two series inductors L1, L1' of a relatively high inductance of approximately 1 μH each are required in the signal processing circuit 3 to give a sufficiently high quality factor, which means that these series inductors are relatively costly and are relatively large, which is a disadvantage. Also required in the filter stage 11, to give a desired value of resonant frequency, are capacitor configurations comprising two capacitors connected in parallel.

Figure 4:
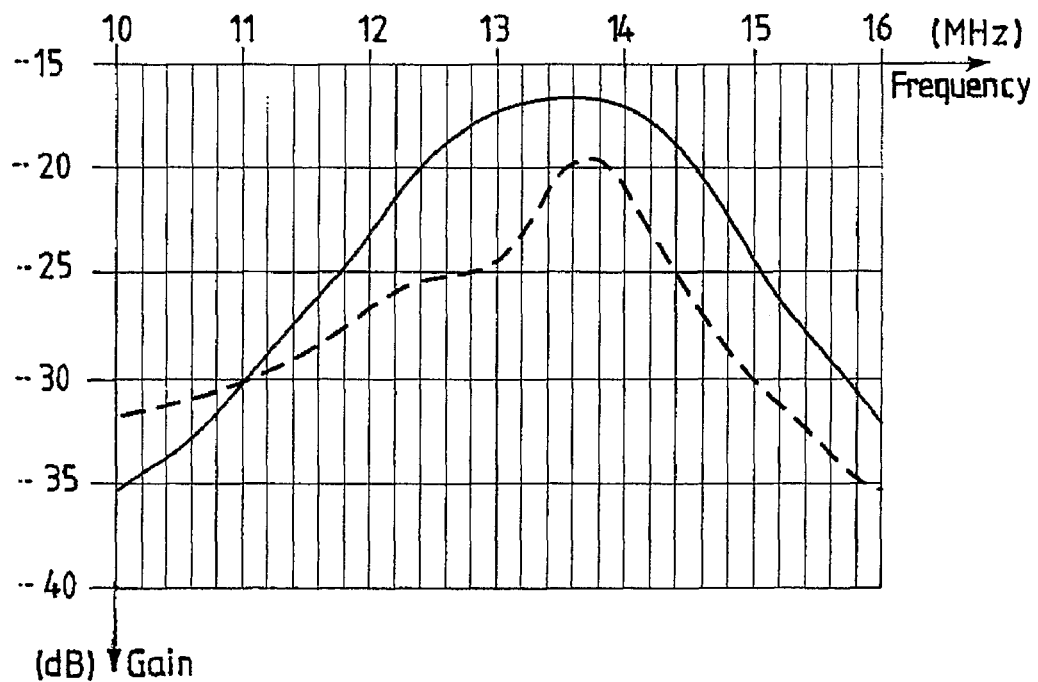
FIG. 4 is a graph showing a transmission frequency response that occurs in the signal processing circuit of the communication partner device shown in FIG. 2.

Because of the resonant frequency selected for the filter stage and because of the position selected for the branch point AP, when the communication partner device 1 shown in FIG. 1 is in the receiving mode it has a relatively narrow-band transmission characteristic, which is found to be a disadvantage because, due to the narrowness of the band, no increase is possible in the data transmission rate. The transmission characteristic is shown in FIG. 4 as a dashed line.

Figure 2:
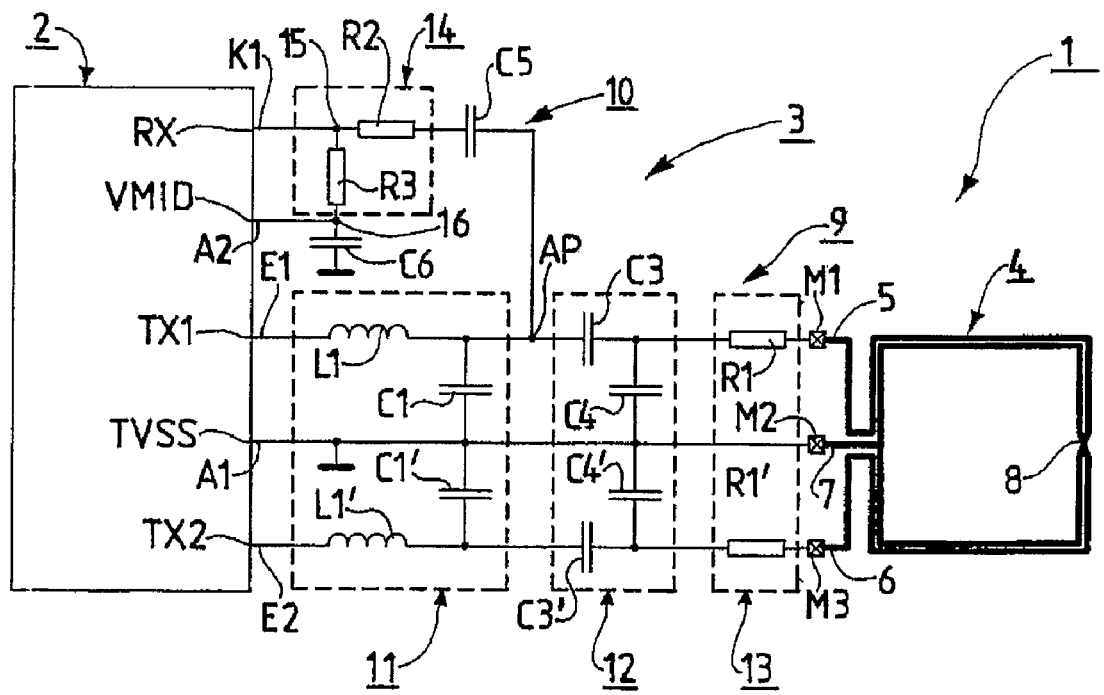
FIG. 2 shows, in a similar way to FIG. 1, a communication partner device according to a first embodiment of the invention, which includes a signal processing circuit according to a first embodiment of the invention.

FIG. 2 shows a communication partner device 1 according to the invention. The communication partner device 1 according to the invention has a signal processing circuit 3 according to the invention. The signal processing circuit 3 according to the invention is similar in construction to the prior-art signal processing circuit 3, but there are two very essential differences in comparison with the signal processing circuit 3 conforming to the known prior art, which two differences produce advantages according to the invention.

The first difference lies in the fact that the filter stage 11 of the signal processing circuit 3 is not tuned for resonance at the operating frequency, but that said filter stage 11 has a resonant frequency of a given value, the value of the resonant frequency of the filter stage 11 being in a frequency range around a value of frequency, which value of frequency corresponds to the sum of the value of the operating frequency, i.e. the frequency of the carrier signal, and the value of one of the possible modulation frequencies, and preferably the value of the highest modulation frequency. In the latter case the sum is 13.56 MHz+848 kHz=14.408 MHz. In the present case this latter frequency forms the center frequency of the frequency range in which the resonant frequency of the filter stage 11 lies. Limits are set in this case for the frequency range in which the value of the resonant frequency of the filter stage lies by an upper limiting value and by a lower limiting value, with the upper limiting value being defined by the value of the upper sideband frequency plus substantially half the value of the modulation frequency, and with the lower limiting value being defined by the value of the upper sideband frequency minus substantially half the value of the modulation frequency. The distance between the upper and lower limiting values and the value of the upper sideband frequency need not be exactly equal to half the value of the modulation frequency but may be half the modulation frequency ±10% of half the value of the modulation frequency, which is what is meant above by the word "substantially".

The second essential difference that exists in the signal processing circuit 3 shown in FIG. 2 lies in the fact that the branch point AP is positioned between the filter stage 11 and the matching stage 12 in this case. The branch point AP is thus situated in a region of the transmitted-signal path 9 that is isolated from the input side of the filter stage 11 by the inductor L1 of the filter stage 11 and that is isolated from the output side of the matching stage 12 by the series capacitor C3 of the matching stage 12.

What is achieved, in a very easy way, by the making of the provisions described above, i.e. in particular by the two essential differences described above that exist in the signal processing circuit 3 according to the invention as compared with the signal processing circuit 3 conforming to the known prior art, is firstly that the filter stage 11 is produced with fewer components, which is beneficial in terms of cost and saves space, and secondly that a wideband transmission characteristic is obtained in a receiving mode, which is particularly advantageous with a view to data transmission that is as fast as possible at a high data transmission rate, because higher data transmission rates can be achieved without any problems due to the wide band obtained, and thirdly that only moderate overshoots occur even when the rises in the signal are very steep, which is advantageous for the satisfactory, error-free transmission of data. FIG. 4 shows the transmission characteristic of the signal processing circuit 3 designed in accordance with the invention in the form of a solid line. It can thus be seen from FIG. 4 that a considerably wider band transmission characteristic exists in the case of a signal processing circuit 3 designed in accordance with the invention.

Figure 3:
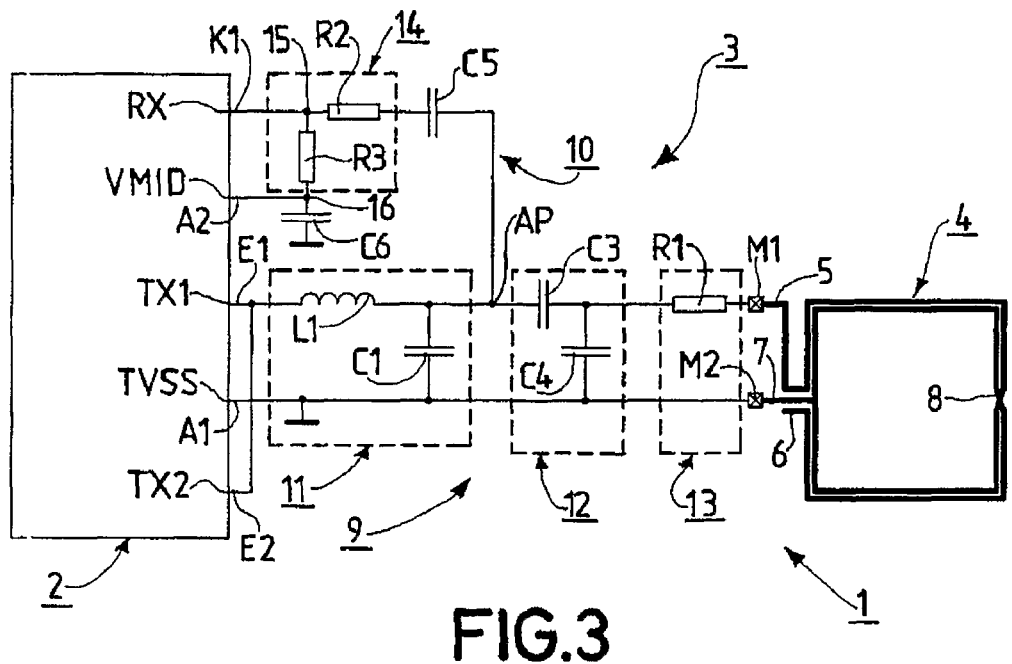
FIG. 3 shows, in a similar way to FIGS. 1 and 2, a communication partner device according to a second embodiment of the invention, which includes a signal processing circuit according to a second embodiment of the invention.

FIG. 3 shows a further solution according to the invention that differs from the design shown in FIG. 2 in that the transmitted-signal path 9 is of only a one-sided configuration with respect to ground potential, whereas the signal processing circuit 3 according to the invention that is shown in FIG. 2 is of a two-sided configuration with respect to ground potential. There is thus a non-symmetrical configuration in the solution shown in FIG. 3 whereas in the solution shown in FIG. 2 there is a symmetrical configuration.

Figure 5:
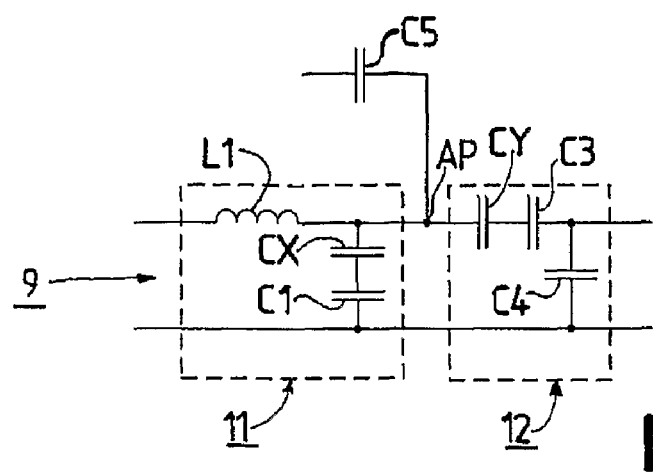
FIG. 5 shows part of a communication partner device according to a third embodiment of the invention that includes a signal processing circuit according to a third embodiment of the invention, which signal processing circuit is a variant of the signal processing circuit shown in FIG. 3.

FIG. 5 shows part of a further solution according to the invention that differs from the design shown in FIG. 3 in that there is not just one parallel capacitor C1 provided in the filter stage 11 but that a further capacitor CX connected in series with the parallel capacitor C1 is provided in addition to the parallel capacitor C1. A further difference from the design shown in FIG. 3 exists in the matching stage 12, in that there is not just one, series capacitor C3 provided in the matching stage 12 but that a further capacitor CY connected in series with the series capacitor C3 is provided in addition to the series capacitor C3. The two further capacitors CX and CY are thus provided in addition to the parallel capacitor C1 and the series capacitor C3 respectively to give values of capacitance which cannot be obtained if parallel capacitor C1 and the series capacitor C3 alone are present in the respective cases. In the present case, the values of the capacitances of the two further capacitors CX and CY are considerably higher than those of the parallel capacitor C1 and the series capacitor C3 respectively. This need not necessarily be the case however, because the values of the capacitances of the further capacitors CX and CY may also be of the same order as those of the capacitors C1 and C3.

In the present case, as it also is in the design shown in FIG. 3, the branch point AP is situated between the filter stage 11 and the matching stage 12. The branch point AP present on the transmitted-signal path 9 is thus situated in a region of the transmitted-signal path 9 that is isolated from the input side of the filter stage 11 by the inductor L1 of the filter stage 11 and that is isolated from the output side of the matching stage 12 by the two capacitor C3 and CY of the matching stage 12.

Figure 6:
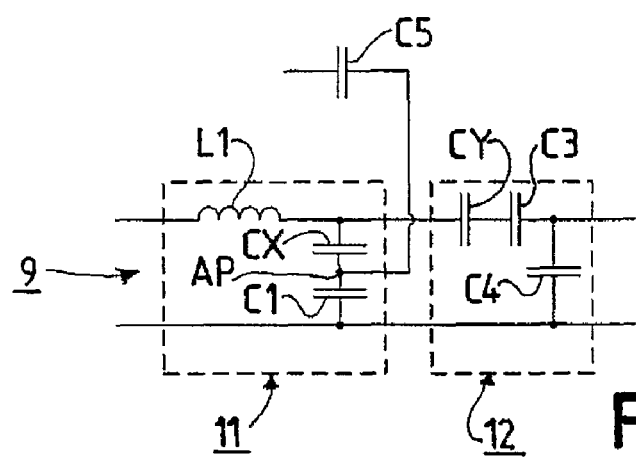
FIG. 6 shows part of a communication partner device according to a fourth embodiment of the invention that includes a signal processing circuit according to a fourth embodiment of the invention, which signal processing circuit is a variant of the signal processing circuit shown in FIGS. 3 and 5.

FIG. 6 shows a further solution according to the invention, which differs from the design shown in FIG. 5 in that the branch point AP is situated between the parallel capacitor C1 and the further capacitor CX of the filter stage 11 in this case. The branch point AP present on the transmitted-signal path 9 is thus situated in a region of the transmitted-signal path 9 that is isolated from the input side of the filter stage 11 by the inductor L1 and the further capacitor CX and that is isolated from the output side of the matching stage 12 by the series capacitor C3 and the further capacitor CY of the matching stage 12 and by the further capacitor CX of the filter stage 11.

Figure 7:
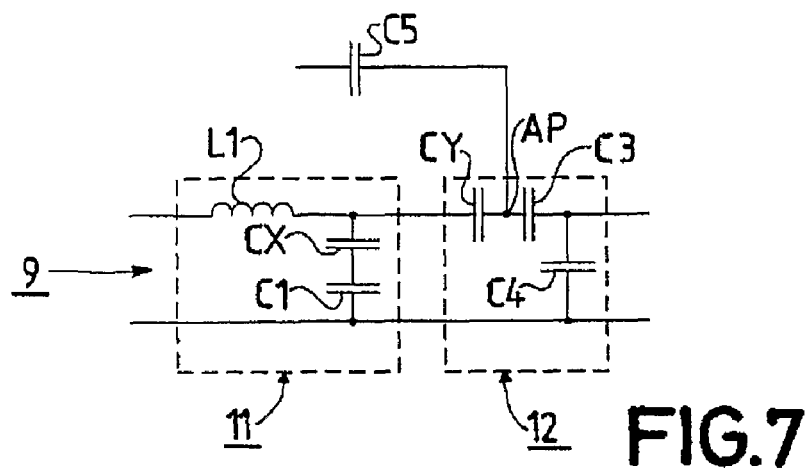
FIG. 7 shows part of a communication partner device according to a fifth embodiment of the invention that includes a signal processing circuit according to a fifth embodiment of the invention, which signal processing circuit is a variant of the signal processing circuit shown in FIGS. 3, 5 and 6.

FIG. 7 shows a further solution according to the invention that differs from the designs shown in FIGS. 5 and 6 in that the branch point AP present on the transmitted-signal path 9 is situated between the series capacitor C3 and the further capacitor CY of the matching stage 12. The branch point AP present on the transmitted-signal path 9 is thus situated in this case in a region that is isolated from the input side of the filter stage 11 by the inductor L1 of the filter stage 11 and the further capacitor CY of the matching stage 12 and that is isolated from the output side of the matching stage 12 by the series capacitor C3 of the matching stage 12.

The solutions according to the invention that are shown in FIGS. 5, 6 and 7 too ensure that the advantages that have already been described by reference to the design shown in FIG. 3 exist and can be achieved.

In a communication partner device according to the invention having a signal processing circuit according to the invention, two series inductors may also be provided in the filter stage rather than only a single one. Values of capacitance desired in the filter stage and also in the matching stage may also be obtained by connecting a plurality of capacitors in parallel and/or in series. The same also applies to the obtaining of desired values of capacitance in the filter stage.

The invention claimed is:

1. A signal processing circuit for a contactless communicating communication partner device comprising:
   a transmitted signal path between a transmitted signal input and a transmission coil connection;
   a filter stage that is coupled to the transmitted signal input, the filter stage having a resonant frequency in a range of frequency values, the range of frequency values being determined by a center frequency, an upper limiting frequency and a lower limiting frequency where the center frequency is defined as the sum of an operating frequency and a modulation frequency, where the upper limiting frequency is defined as the sum of the operating frequency and of substantially half of the modulation frequency and where the lower limiting frequency is defined as the sum of the center frequency and of the negative of substantially half of the modulation frequency;
   a matching stage coupled to the filter stage; and
   a received-signal path between a received signal output and the transmission coil connection where the received-signal path branches off to the received signal output from a branch point situated in a region on the transmitted signal path that is isolated from an input side of the filter stage by a component of the filter stage and that is isolated from an output side of the matching stage by a component of the matching stage.

2. A signal processing circuit as claimed in claim 1, wherein the signal processing circuit is designed for an operating frequency of 13.56 MHz and for the modulation frequency selected from a group of modulation frequencies, which group consists of 106 kHz, 212 kHz, 424 kHz and 848 kHz, and wherein the value of the resonant frequency of the filter stage is in a range of frequency values, the upper and lower limiting frequency of which are defined by the center frequency value plus 500 kHz and by the center frequency value minus 500 kHz, respectively.

3. A signal processing circuit as claimed in claim 1, wherein the value of the resonant frequency of the filter stage is in a range of frequency values, the upper and lower limiting frequency of which are defined by the center frequency value plus 100 kHz and by the center frequency value minus 100 kHz, respectively.

4. A communication partner device having a transceiver circuit, a transmission coil and the signal processing circuit as in claim 1, the signal processing circuit situated between the transceiver circuit and the transmission coil, allowing both a transmitting mode of operation and a receiving mode of operation for the communicating partner device.

5. A signal processing circuit as claimed in claim 1, wherein the transmitted signal path comprises a two-sided configuration with respect to a ground potential.

6. A signal processing circuit as claimed in claim 1, wherein the transmitted signal path comprises a one-sided configuration with respect to a ground potential.

7. A signal processing circuit as claimed in claim 6, wherein the filter stage comprises:
   a series inductor coupled between an input side of the filter stage and an output side of the filter stage;
   a parallel capacitor coupled between the output side of the filter stage and the ground potential; and
   a further capacitor coupled in series with the parallel capacitor, wherein the further capacitor is located between the output side of the filter stage and the parallel capacitor.

8. A signal processing circuit as claimed in claim 7, wherein the branch point is situated in a region between the parallel capacitor and the further capacitor within the filter stage.

9. A signal processing circuit as claimed in claim 7, wherein the further capacitor has a value of capacitance that is of the same order as a value of capacitance of the parallel capacitor.

10. A signal processing circuit as claimed in claim 6, wherein the matching stage comprises:
    a series capacitor coupled between an input side of the matching stage and an output side of the matching stage;
    a parallel capacitor coupled between the output side of the matching stage and the ground potential; and
    a further capacitor coupled in series with the series capacitor, wherein the further capacitor is located between the input side of the matching stage and the series capacitor.

11. A signal processing circuit as claimed in claim 10, wherein the branch point is situated in a region between the series capacitor and the further capacitor within the matching stage.

12. A signal processing circuit as claimed in claim 10, wherein the further capacitor has a value of capacitance that is of the same order as a value of capacitance of the series capacitor.

* * * * *

UNITED STATES PATENT AND TRADEMARK OFFICE
CERTIFICATE OF CORRECTION

| | | |
|---|---|---|
| PATENT NO. | : 7,783,254 B2 | |
| APPLICATION NO. | : 11/631809 | |
| DATED | : August 24, 2010 | |
| INVENTOR(S) | : Peter Raggam and Erich Merlin | |

It is certified that error appears in the above-identified patent and that said Letters Patent is hereby corrected as shown below:

Column 9, Claim 1 needs to be corrected as shown below, 1. (Currently amended) A signal processing circuit for a contactless communicating communication partner device comprising:

a transmitted signal path between a transmitted signal input and a transmission coil connection;

a filter stage that is coupled to the transmitted signal input, the filter stage having a resonant frequency in a range of frequency values, the range of frequency values being determined by a center frequency, an upper limiting frequency and a lower limiting frequency where the center frequency is defined as the sum of an operating frequency and a modulation frequency, where the upper limiting frequency is defined as the sum of the ~~operating~~ center frequency and of substantially half of the modulation frequency and where the lower limiting frequency is defined as the sum of the center frequency and of the negative of substantially half of the modulation frequency;

a matching stage coupled to the filter stage; and a received-signal path between a received signal output and the transmission coil connection where the received-signal path branches off to the received signal output from a branch point situated in a region on the transmitted signal path that is isolated from an input side of the filter stage by a component of the filter stage and that is isolated from an output side of the matching stage by a component of the matching stage.

Signed and Sealed this
First Day of January, 2013

David J. Kappos
*Director of the United States Patent and Trademark Office*

UNITED STATES PATENT AND TRADEMARK OFFICE
CERTIFICATE OF CORRECTION

PATENT NO. : 7,783,254 B2
APPLICATION NO. : 11/631809
DATED : August 24, 2010
INVENTOR(S) : Peter Raggam and Erich Merlin It is certified that error appears in the above-identified patent and that said Letters Patent is hereby corrected as shown below:

Column 9, line 45 - Column 10, line 3, Claim 1 should read,

--1. A signal processing circuit for a contactless communicating communication partner device comprising:

a transmitted signal path between a transmitted signal input and a transmission coil connection;

a filter stage that is coupled to the transmitted signal input, the filter stage having a resonant frequency in a range of frequency values, the range of frequency values being determined by a center frequency, an upper limiting frequency and a lower limiting frequency where the center frequency is defined as the sum of an operating frequency and a modulation frequency, where the upper limiting frequency is defined as the sum of the center frequency and of substantially half of the modulation frequency and where the lower limiting frequency is defined as the sum of the center frequency and of the negative of substantially half of the modulation frequency;

a matching stage coupled to the filter stage; and a received-signal path between a received signal output and the transmission coil connection where the received-signal path branches off to the received signal output from a branch point situated in a region on the transmitted signal path that is isolated from an input side of the filter stage by a component of the filter stage and that is isolated from an output side of the matching stage by a component of the matching stage.--

This certificate supersedes the Certificate of Correction issued January 1, 2013.

Signed and Sealed this
Nineteenth Day of February, 2013

Teresa Stanek Rea
*Acting Director of the United States Patent and Trademark Office*